United States Patent Office 3,721,689
Patented Mar. 20, 1973

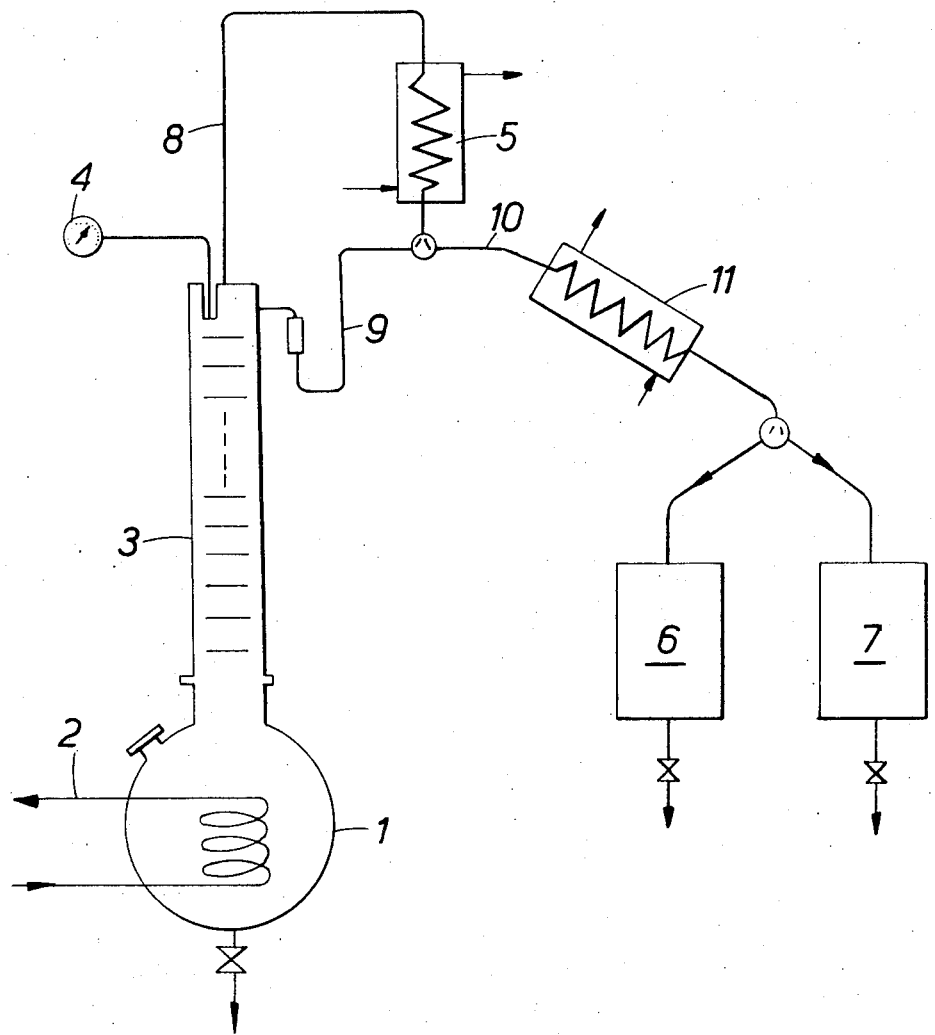

3,721,689
PROCESS FOR PREPARING ALKYL TITANATES BY TRANSESTERIFICATION
Guy Marie Paul Bardinet, Thann, France, assignor to Fabriques de Produits Chemiques de Thann et de Mulhouse, Thann (Haut-Rhin), France
Filed Apr. 9, 1971, Ser. No. 132,785
Claims priority, application France, Apr. 17, 1970, 7013929
Int. Cl. C07f 7/28
U.S. Cl. 260—429.5
13 Claims

ABSTRACT OF THE DISCLOSURE

A transesterification process for the production of an alkyl titanate which comprises distilling under reflux a mixture comprising (a) a titanate of a first alkanol, (b) a second alkanol present in an amount in excess of that required completely to transesterify the titanate of the first alkanol and (c) a quantity of the first alkanol, the boiling point of the second alkanol being higher than the boiling point of the first alkanol, distilling off the first alkanol and the excess quantity of the second alkanol, and recovering from the undistilled residue a titanate of the second alkanol.

---

The present invention relates to the production of alkyl titanates by transesterification.

It is known that alkyl titanates can be prepared by the direct action of titanium tetrachloride ($TiCl_4$) on alcohols in the presence of an inert solvent such as benzene, followed by neutralisation of the hydrochloric acid formed with gaseous ammonia, filtration of the precipitated ammonium chloride, evaporation of the solvent, and distillation of the alkyl titanate in vacuo.

However, some alkyl titanates of high molecular weight cannot easily be distilled and must be prepared indirectly from another titanate which itself can be directly obtained by the process mentioned above.

However, it is often advantageous, for technical or for economic reasons, to manufacture directly, starting from $TiCl_4$, only the more volatile alkyl titanates (base titanates), and to obtain other alkyl titanates starting from the more volatile titanates by transesterification.

The subject of the present invention is a process for preparing, by transesterification, difficult-to-distill alkyl titanates.

The aim of the present invention is to provide a transesterification process for preparing difficult-to-distill alkyl titanates starting from more easily distillable alkyl titanates, which is technically and/or economically more advantageous than the direct preparation by the action of titanium tetrachloride on the corresponding alcohol, but which leads to products of equally high degree of purity.

The present invention provides a transesterification process for the production of an alkyl titanate which comprises distilling under reflux a mixture comprising (a) a titanate of a first alkanol, (b) a second alkanol present in an amount in excess of that required completely to transesterify the titanate of the first alkanol and (c) a quantity of the first alkanol, the boiling point of the second alkanol being higher than the boiling point of the first alkanol, distilling off the first alkanol and the excess quantity of the second alkanol, and recovering from the undistilled residue a titanate of the second alkanol.

The process according to the invention may be represented by the general equation:

$$Ti(OR)_4 + 4R'OH \rightleftharpoons Ti(OR')_4 + ROH \qquad (I)$$

in which R and R' are alkyl radicals, and the alcohol R'OH has a boiling point higher than that of the alcohol ROH. In order that this equilibrium proceeds completely from left to right, the alcohol ROH which is displaced must be removed at the rate that it is formed. On the other hand, it is desirable that the displaced alcohol ROH contain only a very small proportion of alcohol R'OH, so that it can be reused for the direct preparation (starting from $TiCl_4$) of alkyl titanate titanate $Ti(OR)_4$, which serves as the starting material in the transesterification.

During the distillation, a first distillate may be collected which comprises the quantity of first alkanol displaced in the transesterification. This first distillate may be utilised to prepare further titanate of the first alkanol by reaction with titanium tetrachloride as mentioned above. This may then be utilised as starting material in a further transesterification. Distillation is continued after collection of the first distillate and a second distillate may be collected comprising the excess quantities of the first and second alkanols introduced into the original mixture. This second distillate may be used as components (b) and (c) in a subsequent transesterification. Utilisation of the first and second distillates in this way is particularly advantageous when the process of the invention is operated continuously.

Since it is desired to avoid distilling the titanate of the second alkanol which is formed in the transesterification, it is important to remove all final traces of the first and second alkanols from the second alkyl titanate. This is achieved by bubbling an inert gas, conveniently nitrogen, through the undistilled residue under a reduced pressure.

The process will now be further described with reference to the use of n-propanol (boiling point=97° C.) and isopropanol (boiling point=82.4° C.) as alcohols R'OH and ROH respectively in Equation I.

The prepartion of propyl titanate starting from isopropyl titanate proceeds according to the reaction:

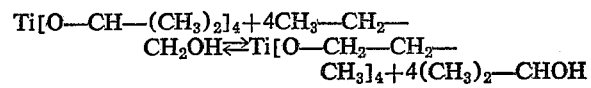

A charge of isopropyl titanate and a charge of n-propanol calculated to be in excess of at least 60% by weight relative to the stoichiometric amount are introduced into a boiler provided with a column having plates or rings suitable for the efficient separation of the n-propanol and the isopropanol. A charge of isopropanol, about 20 to 25% by weight of the isopropanol which can be displaced from the isopropyl titanate, is also introduced. In a continuous industrial process, the two excess charges of propanol and isopropanol may come from recycling previous distillates as described above.

The boiler is progressively heated, the column being kept under total reflux until its thermal equilibrium is reached until the boiling point of isopropanol (82.4° C. under 760 mm. Hg) is observed at the top of the column.

In a first distillation phase, the reflux rate being controlled to maintain the temperature at the top of the column at 82.4° C., under 760 mm. Hg, isopropanol is collected, in stoichiometric proportion relative to the isopropyl titanate introduced, and the very high degree of purity of the isopropanol arises from the fact that there now remains in the boiler and the column, in addition to the excess n-propanol, all the charge of isopropanol. This means that the reflux rate can be maintained at an acceptable level without there being any risk of entrainment of propanol, since this is still far from the end point of the separation of the two alcohols.

In the second distillation phase the temperature at the top of the column rises progressively from 82.4° C. to 97.1° C., which is the boiling point of n-propanol under a pressure of 760 mm. Hg. A second distillate is then collected, which is a mixture comprising, in addition to the original charge of isopropanol, the excess n-propanol, the presence of which is necessary to continue the transesterification reaction to the end point, and which consequently guarantees the purity of the propyl titanate radical.

A third distillation phase begins when the temperature of the boiling reaches 148° C. At this point heating is discontinued and pressure in the apparatus is reduced. When the condensation of the vapours slows down, dry nitrogen is bubbled into the boiler for about half an hour to expel the last traces of free alcohols.

The distillates from the second and third phases of distillation are combined, and may be recycled to a subsequent transesterification.

Very pure n-propyl titanate remains in the boiler.

The following example is given to illustrate the invention. The n-propanol employed is denatured with benzene, this makes the operation more difficult and the excellent result obtained is a further confirmation of the efficacy of the invention.

Since the process was carried out when atmospheric pressure was 730 mm. Hg, the boiling points are lower than those indicated in the description above. The analyses are performed by gas phase chromatography.

The reaction is carried out in apparatus illustrated diagrammatically in the accompanying drawing. The apparatus comprises flask 1, heated by electric element 2 and surmounted by glass fractionation column 3 containing 20 plates. Thermometer 4 is provided at the head of column 3 which leads through line 8 to reflux condenser 5 fitted with automatic control (not shown) to return refluxing liquid back to column 3 through line 9 or through line 10 and condenser 11 to receivers 6 or 7.

EXAMPLE

The following charge is introduced into a 5 litre glass flask serving as boiler 1:

1,500 g. of isopropyl titanate
2,030 g. of n-propanol (that is to say 60% excess by weight relative to the stoichiometric amount)
95 g. of benzene
293 g. of isopropanol (that is to say 23% by weight relative to the isopropanol which can stoichiometrically be displaced).

The mixture is heated electrically to reflux and a first distillate of two parts collected in receiver 6. The first part passes over between 70° C. and 80° C. under 730 mm. Hg and corresponds to a benzene-isopropanol azeotrope of boiling point=70° C. under 730 mm. Hg. This first part weighs 228 g. and consists of:

|  | Percent |
|---|---|
| Isopropanol | 58 |
| Benzene | 42 |
| n-Propanol | traces. |

The second part, 1,122 g., passes over at 80.5° C. under 730 mm. Hg, and consists of:

|  | Percent |
|---|---|
| Isopropanol | 99.3 |
| Benzene | 0.4 |
| n-Propanol | 0.3 |

This first distillate is used for the direct preparation of further isopropyl titanate.

The second distillate is collected in the receiver 7, and passes over between 81.1° C. and 95.7° C.

When the temperature of the boiler reaches 148° C., heating is discontinued and a reduced pressure is applied in the apparatus. The residual vacuum is 55 mm. Hg before introducing dry nitrogen, and is 80 mm. Hg while dry nitrogen is introduced for half an hour.

The traces of alcohols obtained are also collected in the receiver 7, which finally contains 858 g. consisting of:

|  | Percent |
|---|---|
| Isopropanol | 23.1 |
| n-Propanol | 76.9 |

The boiler, at the end of the operations, contains 1,500 g. of extremely pure n-propyl titanate having the following analysis:

|  | Percent |
|---|---|
| n-Propyl titanate | 99.8 |
| Isopropyl titanate | 0.2 |
| Free n-propanol and isopropanol | traces, below 0.02% |

The loss of 210 g. of alcohols, shown by the difference between the amounts at the start and at the end of the reaction, can be considerably reduced by installing a cold trap.

While the above example illustrates the conversion of isopropyl titanate to n-propyl titanate, the process is equally applicable to the conversion of other alkyl titanates provided the boiling point of the second alkanol is higher than that of the first alkanol.

I claim:

1. A transesterification process for the production of an alkyl titanate which comprises mixing (a) a titanate of a first alkanol, (b) a second alkanol present in an amount in excess of that required completely to transesterify the titanate of the first alkanol and (c) a quantity of preformed first alkanol, the boiling point of the second alkanol being higher than the boiling point of the first alkanol, distilling under reflux the resulting mixture of (a), (b) and (c), distilling off the first alkanol and the excess quantity of the second alkanol, and recovering without distillation from the undistilled residue a titanate of the second alkanol.

2. A process according to claim 1 wherein a first distillate is collected comprising a quantity of the first alkanol displaced in the transesterification which is of sufficient purity for direct conversion into its titanate ester.

3. A process according to claim 2 wherein the first distillate is esterified with a further quantity of titanium tetrachloride to provide a further quantity of titanate of the first alkanol.

4. A process according to claim 2 wherein a second distillate is collected comprising the excess quantities of the first and second alkanols present in the mixture.

5. A process according to claim 4 wherein the second distillate is recycled and utilised as components (b) and (c) in a subsequent transesterification.

6. A process according to claim 4 wherein an inert gas is bubbled through the undistilled residue under reduced pressure to remove any traces of the first and second alkanols.

7. A process according to claim 6 wherein the traces of first and second alkanols removed with the inert gas are combined with the second distillate.

8. A process according to claim 6 wherein the inert gas is nitrogen.

9. A process according to claim 1 wherein the amount of the second alkanol in component (b) is sufficient to provide at least a 60% excess by weight of that stoichiometrically required for transesterification.

10. A process according to claim 1 wherein the quantity of the first alkanol in component (c) is 20–25% by weight of the quantity of first alkanol to be displaced in the transesterification.

11. A process according to claim 1 wherein the first alkanol is isopropanol and the second alkanol is n-propanol.

12. A process according to claim 1 wherein a mixture comprising (a) isopropyl titanate, (b) an amount of n-propanol which is about 60% by weight in excess of that stoichiometrically required for transesterification and (c) an amount of isopropanol which is about 23% by weight relative to the amount of isopropanol that can theoretically be displaced from the isopropyl titanate, is heated under reflux, a first distillate is collected comprising the theoretical quantity of isopropanol displaced from the isopropyl titanate, a second distillate is collected comprising n-propanol and isopropanol, a stream of nitrogen is passed through the undistilled residue under reduced pressure to remove final traces of n-propanol and isopropanol, and pure n-propyl titanate is recovered from the undistilled residue.

13. A process according to claim 12 operated continuously wherein the first distillate is reacted with titanium tetrachloride and the resulting isopropyl titanate recycled as component (a) and wherein the n-propanol and isopropanol recovered in the nitrogen stream are combined with the second distillate and the combined second distillate recycled after making up any loss of n-propanol or isopropanol as components (b) and (c).

References Cited
UNITED STATES PATENTS

| | | | |
|---|---|---|---|
| 3,306,918 | 2/1967 | Schenk | 260—429.5 |
| 3,268,566 | 8/1966 | Stanley et al. | 260—429.5 |

OTHER REFERENCES

Chemical Abstracts, vol 47, 2684f (1953).
Chemical Abstracts, vol 47, 6296a (1953).
Chemical Abstracts, vol. 46, 7994h (1952).
Chemical Abstracts, vol. 47, 12082b (1953).
Chemical Abstracts, vol 44, 538–539 (1950).
Chemical Abstracts, vol 46, 11002h (1952).

HELEN M. S. SNEED, Primary Examiner